United States Patent
Maise et al.

(10) Patent No.: US 10,009,289 B2
(45) Date of Patent: Jun. 26, 2018

(54) CONTROL DEVICE FOR CONNECTING A CAN BUS TO A RADIO NETWORK, AND MOTOR VEHICLE HAVING SUCH A CONTROL DEVICE

(71) Applicant: Dr. Ing. h.c. F. Porsche Aktiengesellschaft, Stuttgart (DE)

(72) Inventors: Timo Maise, Ludwigsburg (DE); Paul Behrendt, Leonberg (DE); Kai Schneider, Neuffen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 111 days.

(21) Appl. No.: 15/085,344

(22) Filed: Mar. 30, 2016

(65) Prior Publication Data
US 2016/0294724 A1 Oct. 6, 2016

(30) Foreign Application Priority Data

Apr. 2, 2015 (DE) .................. 10 2015 105 110

(51) Int. Cl.
*H04L 12/927* (2013.01)
*H04L 12/40* (2006.01)
(Continued)

(52) U.S. Cl.
CPC .......... *H04L 47/801* (2013.01); *H04L 12/40* (2013.01); *H04L 12/413* (2013.01); *H04L 41/00* (2013.01); *H04L 67/12* (2013.01); *H04W 4/046* (2013.01)

(58) Field of Classification Search
CPC .......... H04L 12/40; H04L 2012/40215; H04L 12/4625; H04L 25/08; H04L 63/08; H04L 63/123; H04L 67/12; H04L 63/1441
See application file for complete search history.

(56) References Cited

U.S. PATENT DOCUMENTS

2010/0174439 A1 7/2010 Petricoin
2010/0306457 A1 12/2010 Wilson
(Continued)

FOREIGN PATENT DOCUMENTS

DE 4126850 2/1993
DE 102011051758 1/2013
KR 101472896 12/2014

OTHER PUBLICATIONS

German Search Report for German Application No. 10 2015 105 110.9 dated Feb. 16, 2016, including partial English language translation.

*Primary Examiner* — Ian N Moore
*Assistant Examiner* — Mewale Ambaye
(74) *Attorney, Agent, or Firm* — RatnerPrestia

(57) ABSTRACT

A control device, which connects a controller area network (CAN) bus to a radio network, includes a wireless controller, a microcontroller, a CAN controller and a CAN transceiver. The CAN controller has a first channel and a second channel for transmitting (Tx) and receiving (Rx) frames. The microcontroller is connected, on the one hand, to the wireless controller and, on the other hand, to the first channel of the CAN controller. The CAN transceiver is connected, on the one hand, to the second channel of the CAN controller and, on the other hand, to the CAN bus. The CAN controller configured in such a manner that it transmits or blocks a frame received on the first channel on the basis of an identifier of the frame on the second channel. Also described is a motor vehicle having such a control device.

4 Claims, 1 Drawing Sheet

(51) Int. Cl.
    *H04L 12/24*     (2006.01)
    *H04L 12/413*     (2006.01)
    *H04L 29/08*     (2006.01)
    *H04W 4/04*     (2009.01)

(56) References Cited

U.S. PATENT DOCUMENTS

| | | | |
|---|---|---|---|
| 2013/0227648 A1 | 8/2013 | Ricci | |
| 2014/0334317 A1* | 11/2014 | Atreya | H04L 63/14 370/252 |
| 2015/0089236 A1* | 3/2015 | Han | H04L 9/3242 713/181 |
| 2015/0172306 A1* | 6/2015 | Kim | H04L 63/1425 726/23 |

* cited by examiner

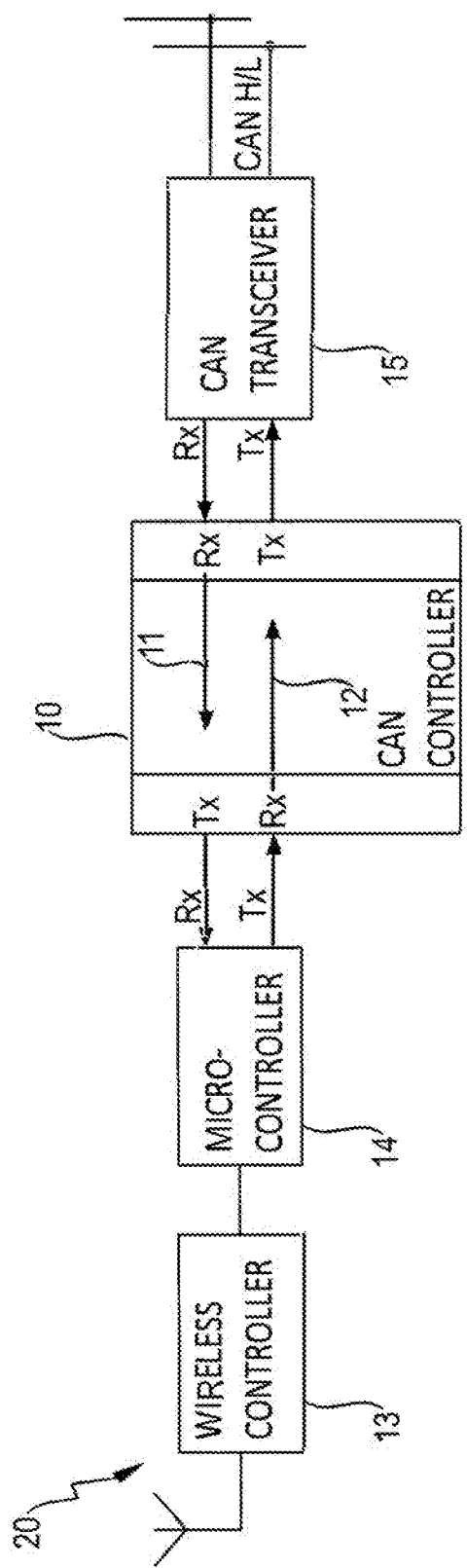

CONTROL DEVICE FOR CONNECTING A CAN BUS TO A RADIO NETWORK, AND MOTOR VEHICLE HAVING SUCH A CONTROL DEVICE

CROSS-REFERENCE TO RELATED APPLICATION

This application claims priority to German Patent Application No. DE 10 2015 105 110.9, filed Apr. 2, 2015, which is incorporated by reference herein in its entirety.

FIELD OF THE INVENTION

The present invention relates to a control device. The present invention also relates to a motor vehicle having such a control device.

BACKGROUND OF THE INVENTION

A widespread vehicle area network (VAN) which is internationally standardized according to ISO 11898 is familiar to a person skilled in the art as a controller area network (CAN). Wireless interfaces for such a vehicle area network are also known. However, an unauthorized third party can also access the vehicle area network via such an interface and can thus interfere with or paralyze the vehicle area network. It is therefore sometimes proposed to prevent write access (transmit, Tx) to the vehicle area network via the interface. However, no diagnoses or network management applications can be executed in this case via the interface.

DE 10 2011 051 758 A1, which is incorporated by reference herein, discloses a CAN bus adapter for connection to the CAN bus of a motor vehicle. The CAN bus adapter has at least one first interface for connection to the CAN bus of a motor vehicle and at least one second interface for wireless or wired connection to a computer or a device of that kind. The CAN bus adapter is distinguished by the fact that at least one buffer is provided and is designed to store the CAN bus data received from the first interface according to the first-in-first-out principle if necessary.

US 2010/0306457 A1, which is incorporated by reference herein, relates to a microcontroller having a random access memory and a CAN controller which has a control unit which receives an assembled CAN message, the control unit being set up to generate a buffer descriptor table entry using the assembled CAN message and to store this buffer descriptor table entry in the random access memory. The buffer descriptor table entry comprises at least one message identifier and useful data from the CAN message and information relating to a subsequent buffer descriptor table entry.

Finally, DE 41 26 850 A1, which is incorporated by reference herein, proposes a circuit arrangement for adapting a data bus controller module to a symmetrical bus line, in particular according to the CAN bus system, in order to add a reactance, which has been inserted into the transmission signal path from the controller module to the bus line and has a low shunt capacitance and a controllably variable inductance value, and a control circuit for temporally changing the inductance acting on the transmission signal current on the basis of signal edges of the transmission signal.

US 2013/0227648 A1, which is incorporated by reference herein, and US 2010/0174439 A1, which is incorporated by reference herein, discuss similar apparatuses.

SUMMARY OF THE INVENTION

If an unauthorized third party transmits unauthorized messages via such an interface, they are blocked according to the operating principle of a receive filter. In contrast, if the third party transmits authorized messages, they are transmitted on the CAN bus. Diagnoses or network management functions, for instance, should be borne in mind in this case.

The identifiers associated with authorized messages may therefore be selected as highest possible values since, if two control devices access the CAN bus at the same time, the control device with the higher identifier withdraws according to the principle known as CAN bus arbitration. If an attacker manages to initiate the transmission of authorized messages for diagnosis, network management, component protection or any customer function, for example, they are indeed transmitted on the CAN but do not interfere with the other CAN users during normal operation because the identifiers of the relevant frames are always in a higher range of values.

In one preferred embodiment, the CAN controller is configured in such a manner that it blocks the frame if the frame is an error frame. Even if an attacker manages to initiate the transmission of error frames by the microcontroller, they are therefore not transmitted on the CAN bus.

Microcontrollers in the SAK-XL . . . series, for example SAK-XL 2265N-40F80LAA or SAK-XL 2224L-20F66VAA, from Infineon which support at least two CAN channels and can themselves control the CAN channels come into consideration as CAN controllers.

BRIEF DESCRIPTION OF THE DRAWING

One exemplary embodiment of the invention is illustrated in the drawing and is described in more detail below.

The FIGURE shows the block diagram of a control device according to the invention.

DETAILED DESCRIPTION OF THE INVENTION

The single FIGURE illustrates the fundamental structure of a control device 20 for connecting a CAN bus (CAN H/L) to a radio network. For this purpose, the control device 20 comprises a wireless controller 13, a microcontroller 14, a CAN controller 10 and a CAN transceiver 15.

The CAN controller 10 inserted between the microcontroller and the CAN transceiver corresponds to the Infineon SAK-XL . . . type and therefore has a first channel and a second channel for transmitting (Tx) and receiving (receive, Rx) frames. Such a CAN controller 10 has one receive filter 11, 12 for each channel. On the other hand, transmit filters are not customary. Under certain circumstances, yet another microcontroller 14 not represented in the FIGURE must be implemented in order to control the CAN controller 10.

The microcontroller 14 is connected, on the one hand, to the wireless controller 13 and, on the other hand, to the first channel of the CAN controller 10, whereas the CAN transceiver 15 is connected, on the one hand, to the second channel of the CAN controller 10 and, on the other hand, to the CAN bus CAN H/L. In this case, the CAN controller 10 is configured in such a manner that it transmits or blocks a frame received on the first channel on the basis of an identifier of the frame on the second channel.

Specifically, the CAN controller 10 is configured in such a manner that it transmits the frame if the identifier denotes diagnosis, network management, component protection or a customer function. The CAN controller 10 forwards corresponding messages, which it receives via the Rx inputs, to the Tx output of the respective other channel.

In contrast, unauthorized messages or error frames are blocked by the CAN controller 10.

The permissible functions mentioned above are denoted by the largest possible identifiers in this case. If two control devices access the CAN bus CAN H/L at the same time, the device with the higher identifier value withdraws. This ensures that diagnosis, network management and component protection cannot delay or otherwise interfere with the regular data traffic on the CAN bus CAN H/L.

What is claimed is:

1. A control device for connecting a controller area network (CAN) bus to a radio network, comprising:
    a wireless controller, a microcontroller, a CAN controller and a CAN transceiver,
    the CAN controller has a first channel and a second channel for transmitting (Tx) and receiving (Rx) frames,
    the microcontroller is connected to the wireless controller and to the first channel of the CAN controller,
    the CAN transceiver is connected to the second channel of the CAN controller and to the CAN bus, and
    the CAN controller transmits or blocks a frame received on the first channel from the wireless controller through the microcontroller for delivery to the CAN bus on a basis of an identifier of the frame received on the second channel from the CAN transceiver, wherein the largest possible identifiers denote permissible functions, the CAN controller supports at least two CAN channels, and the CAN controller transmits the frame if the identifier denotes one of the following permissible functions:
    diagnosis,
    network management,
    component protection, or
    a customer function.

2. The control device as claimed in claim 1, wherein the CAN controller blocks the frame if the frame is an error frame.

3. The control device as claimed in claim 1, further comprising a further microcontroller for controlling the CAN controller.

4. A motor vehicle having a control device for connecting a controller area network (CAN) bus to a radio network, the control device comprising:
    a wireless controller, a microcontroller, a CAN controller and a CAN transceiver,
    the CAN controller has a first channel and a second channel for transmitting (Tx) and receiving (Rx) frames,
    the microcontroller is connected to the wireless controller and to the first channel of the CAN controller,
    the CAN transceiver is connected to the second channel of the CAN controller and to the CAN bus, and
    the CAN controller transmits or blocks a frame received on the first channel from the wireless controller through the microcontroller for delivery to the CAN bus on a basis of an identifier of the frame received on the second channel from the CAN transceiver, wherein the largest possible identifiers denote permissible functions, the CAN controller supports at least two CAN channels, and the CAN controller transmits the frame if the identifier denotes one of the following permissible functions:
    diagnosis,
    network management,
    component protection, or
    a customer function.

\* \* \* \* \*